United States Patent
Yvind et al.

(10) Patent No.: US 12,486,160 B2
(45) Date of Patent: Dec. 2, 2025

(54) GRATING REFLECTOR

(71) Applicant: Danmarks Tekniske Universitet, Kgs. Lyngby (DK)

(72) Inventors: Kresten Yvind, Kgs. Lyngby (DK); Arnhold Simonsen, Kgs. Lyngby (DK); Gyeong Cheol Park, Kgs. Lyngby (DK); Thor Ansbæk, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 837 days.

(21) Appl. No.: 17/682,433

(22) Filed: Feb. 28, 2022

(65) Prior Publication Data

US 2023/0271824 A1   Aug. 31, 2023

(51) Int. Cl.
*H01S 5/10*      (2021.01)
*B81B 3/00*      (2006.01)
*H01S 5/183*     (2006.01)

(52) U.S. Cl.
CPC .......... *B81B 3/007* (2013.01); *H01S 5/18363* (2013.01); *B81B 2201/042* (2013.01); *B81B 2203/053* (2013.01)

(58) Field of Classification Search
CPC .......................... G02B 5/1861; G02B 5/1823
See application file for complete search history.

(56) References Cited

U.S. PATENT DOCUMENTS 9,093,819 B2 *   7/2015   Fattal ................ H01S 5/18363
9,337,618 B2     5/2016   Yvind
2014/0353530 A1  12/2014  Hasnain

FOREIGN PATENT DOCUMENTS

WO   WO-2019217794 A1 *  11/2019  .......... H01S 5/18311

OTHER PUBLICATIONS

Ikeda et al. "Polarization-Independent High-Index Contrast Grating and Its Fabrication Tolerances." Applied optics (2004) 52.5 (2013): 1049-1053. Web. (Year: 2013).*
Polarization-independent high-index contrast grating and its fabrication tolerances (Year: 2013).*
Carletti, L. et al.; "High-index-contrast grating reflector with beam steering ability for the transmitted beam"; Optics Express, vol. 19, No. 23, pp. 23567-23572; Nov. 7, 2011; retrieved from https://doi.org/10.1364/OE.19.023567 (7 pages).

(Continued)

*Primary Examiner* — Minsun O Harvey
(74) *Attorney, Agent, or Firm* — Nixon Peabody LLP

(57) ABSTRACT

A grating reflector. The grating reflector includes a mesh structure defining a mesh plane and having a thickness normal thereto. The mesh structure includes parallel bars and parallel crossbars, which extend along a direction orthogonal to the bars. The bars and crossbars define a 2D grid of elongated holes, each extending through the mesh structure perpendicular to the mesh plane. The holes are elongated along a direction parallel to the bars and have a substantially rectangular shape with rounded corners. The 2D grid is defined by a cross-shaped unit cell having a bar section and an intersecting crossbar section. The grating reflector has a reflectivity in a bandwidth around a center wavelength higher than 0.99. A ratio between the unit cell volume and the center wavelength in the mesh material cubed is between 1.35 and 1.55.

20 Claims, 6 Drawing Sheets
(4 of 6 Drawing Sheet(s) Filed in Color)

(56) References Cited

OTHER PUBLICATIONS

Kazuhiro Ikeda et al.; "Polarization-independent high-index contrast grating and its fabrication tolerances"; Applied Optics, vol. 52, No. 5, pp. 1049-1053; Feb. 10, 2013 (5 pages).

Kun Li et al.; "Widely tunable 1060-nm VCSEL with high-contrast grating mirror": Optics Express, vol. 25, No. 10, #286823; May 15, 2017; retrieved from https://doi.org/10.1364/OE.25011844 (11 pages).

Pengfei Qiao et al.; "MEMS-tunable VCSELs using 2D high-contrast gratings"; Optics Letters, vol. 42, No. 4, pp. 823-826; Feb. 15, 2017; https://doi.org/10.1364/OL.42.00083 (4 pages).

Pengfei Qiao; "Surface-Emitting Lasers for Communications: Novel Metal-Cavity Microlasers and High-Contrast-Grating Tunable VCSELs"; Dissertation; University of Illinois at Urbana-Champaign; 2015 (151 pages).

Mote, R. et al.; "Design and analysis of two-dimensional high-index-contrast grating surface-emitting lasers"; Optics Express, vol. 17, No. 1; Jan. 5, 2009 (6 pages).

Lousse, V. et al.; "Angular and polarization properties of a photonic crystal slab mirror"; Optics Express, vol. 12, No. 8; Apr. 19, 2004 (8 pages).

EMPossible; Lecture Notes entitled "Advanced Computation: Computational Electromagnetics—Formulation of Rigorous coupled-Wave Analysis (RCWA)"; Apr. 6, 2020; retrieved from https://empossible.net/wp-content/uploads/2019/08/Lecture-7a-RCWA-Formulation.pdf on Mar. 2, 2022 (25 pages).

EMPossible; Lecture Notes entitled "Advanced Computation: Computational Electromagnetics—Implementation of Rigorous Coupled-Wave Analysis (RCWA)"; Oct. 28, 2019; retrieved from https://empossible.net/wp-content/uploads/2019/08/Lecture-7b-RCWA-Implementation.pdf on Mar. 2, 2022 (10 pages).

EMPossible; Lecture Notes entitled "RCWA Extras"; Jun. 2, 2021; retrieved from https://empossible.net/wp-content/uploads/2019/08/Lecture-7c-RCWA-Extras.pdf on Mar. 2, 2022 (37 pages).

\* cited by examiner

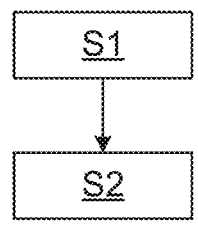
*FIG. 5*
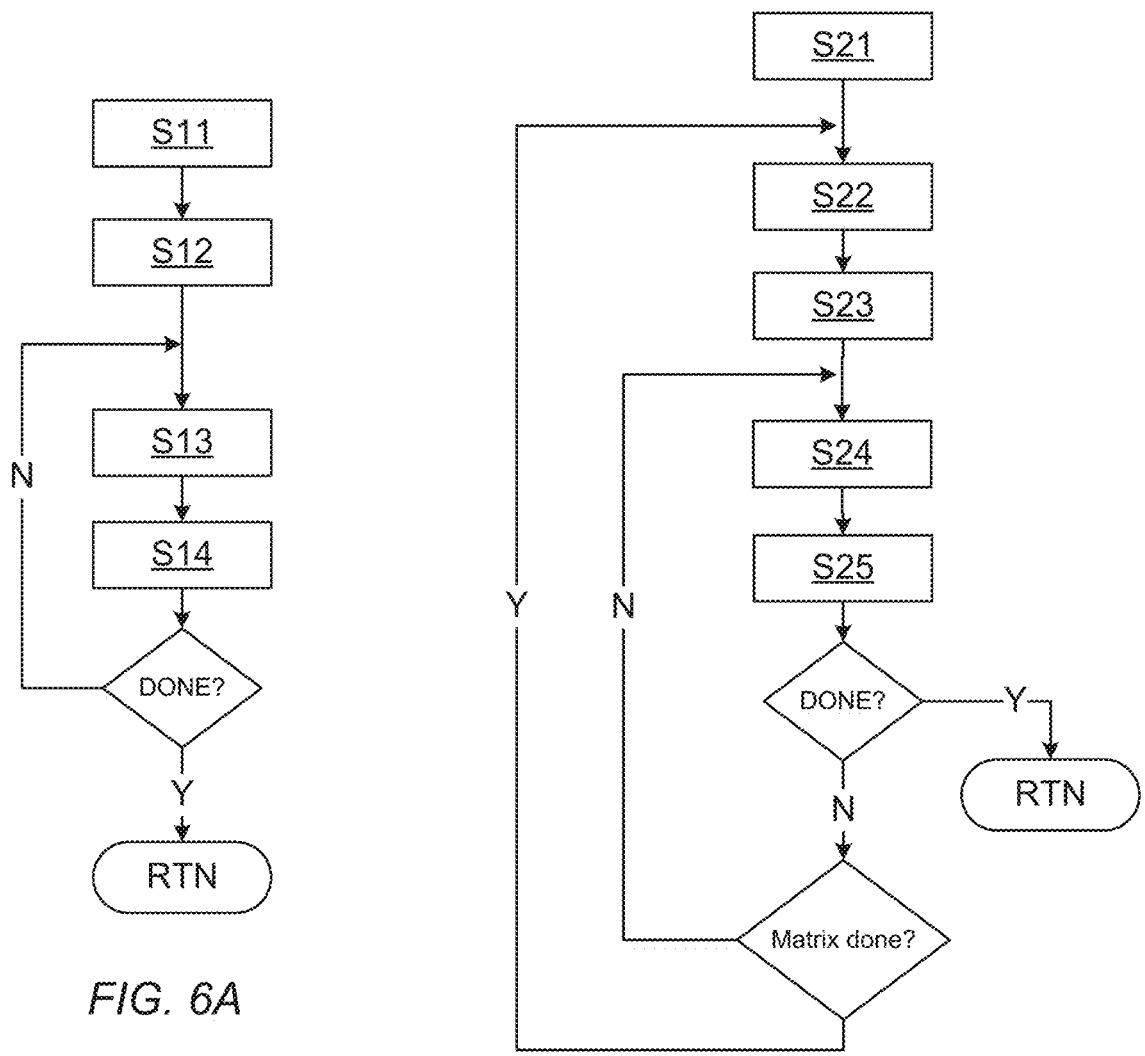
*FIG. 6A*
*FIG. 6B*

GRATING REFLECTOR

TECHNICAL FIELD

The present disclosure relates to a grating reflector, a method for manufacturing a grating reflector, and to a vertical cavity surface emitting laser including such a grating reflector.

BACKGROUND

Grating reflectors are used in a number of applications. In particular, wavelength tunable or wavelength sweepable vertical cavity surface emitting lasers may include a grating reflector as a movable mirror. In this and other applications, where the grating reflector is part of a microelectromechanical system (MEMS), it is desirable that the grating reflector fulfills a number of optical as well as mechanical properties.

U.S. Pat. No. 9,337,618 discloses an example of a vertical cavity surface emitting laser (VCSEL). In particular, U.S. Pat. No. 9,337,618 discloses a wavelength sweepable laser source, wherein the laser source is a semiconductor laser source adapted for generating laser light at a lasing wavelength. The laser source comprises a substrate, a first reflector, and a second reflector. The first and second reflectors together define an optical cavity and are arranged to support light oscillation in the optical cavity along an optical path in a direction normal to the substrate. The optical cavity comprises a void in the optical path. The second reflector is resiliently suspended by a suspension in a distance from the first reflector and has a rest position, the second reflector and suspension together defining a microelectromechanical (MEMS) oscillator.

At least for some applications it is desirable to provide a grating reflector that has a high polarization-dependent reflectivity across a broad bandwidth. In particular, this is desirable for wavelength tunable or sweepable VCSELs. Wavelength tunable or sweepable laser sources are attractive for a number of applications, such as spectroscopy and optical coherence tomography (OCT). In such applications, it is desirable that the laser source has a large tuning or sweeping range.

Moreover, in the above and other applications it is desirable that the grating reflector is light, yet mechanically robust.

BRIEF SUMMARY

Aspects of the present disclosure address the above matters, and others.

In particular, the present disclosure provides embodiments of a grating reflector that has a high polarization dependent reflectivity across a broad bandwidth and that is light yet mechanically robust.

In some embodiments, the grating reflector comprises a mesh structure of a mesh material, the mesh structure defining a mesh plane and having a thickness normal to the mesh plane, the mesh structure comprising a plurality of parallel bars and a plurality of parallel crossbars, the crossbars extending along a direction orthogonal to the bars, the bars and crossbars defining a two-dimensional grid of elongated holes, each hole extending through the mesh structure in a direction normal to the mesh plane, each hole being defined between two adjacent bars and two adjacent crossbars; the holes being elongated along a direction parallel to the bars, the holes having a substantially rectangular shape with rounded corners having a radius of curvature; the two dimensional grid being defined by a cross-shaped unit cell, the unit cell comprising a bar section and a crossbar section intersecting the bar section, the bar section having a bar width and a bar section length, the crossbar section having a crossbar width and a crossbar section length; the unit cell having a unit cell volume defined by the thickness of the mesh structure, the bar section length, the bar width, the crossbar section length, the crossbar width and by the radius of curvature. The grating reflector has a reflectivity in a bandwidth around a center wavelength higher than 0.99. A ratio between the unit cell volume and the center wavelength in the mesh material cubed is between 1.35 and 1.55.

According to another aspect, disclosed herein are embodiments of a wavelength tunable or wavelength sweepable vertical cavity surface emitting laser. Embodiments of the wavelength tunable or wavelength sweepable vertical cavity surface emitting laser comprise a movable grating reflector as disclosed above and in the following.

According to yet another aspect, disclosed herein are embodiments of a method for manufacturing a grating reflector. The grating reflector comprises a mesh structure of a mesh material, the mesh structure defining a mesh plane and having a thickness normal to the mesh plane and comprising a plurality of parallel bars and a plurality of parallel crossbars, the crossbars extending along a direction orthogonal to the bars, the bars and crossbars defining a two-dimensional grid of elongated holes, each hole extending through the mesh structure in a direction normal to the mesh plane, each hole being defined between two adjacent bars and two adjacent crossbars; the holes being elongated along a direction parallel to the bars, the holes having a substantially rectangular shape with rounded corners having a radius of curvature; the two dimensional grid being defined by a cross-shaped unit cell of the grid, the unit cell comprising a bar section and a crossbar section intersecting the bar section, the bar section having a bar width and a bar section length, the crossbar section having a crossbar width and a crossbar section length; the unit cell having a unit cell volume defined by the thickness of the mesh structure, the bar section length, the bar width, the crossbar section length, the crossbar width and by the radius of curvature.

The method comprises:
  selecting the thickness of the mesh structure, the bar section length, the bar width, the crossbar section length, the crossbar width and the radius of curvature such that a reflectivity of the reflector in a bandwidth around a predetermined center wavelength is higher than a predetermined threshold reflectivity; and
  manufacturing the grating reflector having the selected thickness of the mesh structure, the selected bar section length, the selected bar width, the selected crossbar section length, the selected crossbar width and the selected radius of curvature.

Various embodiments of the grating reflector disclosed herein may be manufactured using embodiments of the method disclosed herein.

Those skilled in the art will recognize still other aspects of the present application upon reading and understanding the attached description.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other aspect are illustrated by way of example and not limited by the figures of the accompanying drawings, in which like references indicate similar elements and in which:

FIG. 5 schematically illustrates an example process for manufacturing a grating reflector in accordance with embodiments described herein;

FIGS. 6A and 6B schematically illustrate examples of a process for selecting the thickness of the mesh structure, the bar section length, the bar width, the crossbar section length, the crossbar width and the radius of curvature such that a reflectivity of the reflector in a bandwidth around a predetermined center wavelength is higher than a predetermined threshold reflectivity;

DETAILED DESCRIPTION

The following describes a grating reflector that mitigates one or more of the above-noted and/or other shortcomings of existing grating reflectors or that can at least serve as an alternative to existing grating reflectors. The following further describes a method for manufacturing such a grating reflector and a laser source comprising such a grating reflector.

Figure 1:
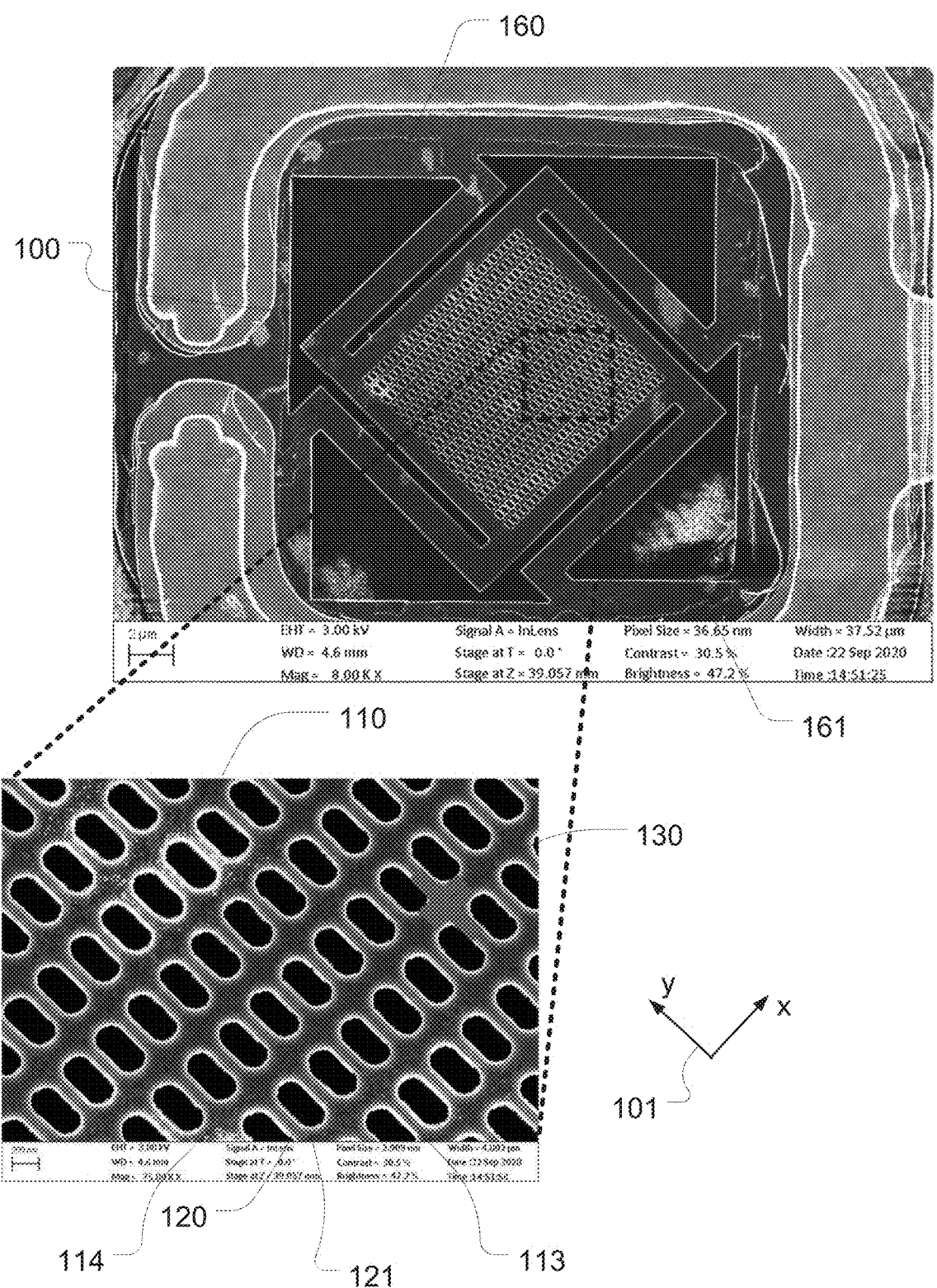
FIG. 1 diagrammatically illustrates an example of a grating reflector in accordance with embodiments described herein.

FIG. 1 illustrates an example of a grating reflector 100.

The grating reflector comprises a mesh structure 110 of a mesh material, the mesh structure defining a mesh plane (the plane of the drawing in FIG. 1) and has a thickness normal to the mesh plane. The mesh structure comprises a plurality of parallel bars 113 and a plurality of parallel crossbars 114. The crossbars extend along a direction orthogonal to the bars. In the example of FIG. 1, the bars extend along the y-direction and the crossbars extend along the x-direction of the coordinate system 101 that spans the mesh plane. The bars and crossbars define a two-dimensional grid of elongated holes 120. Each hole extends through the mesh structure in a direction normal to the mesh plane. Each hole is defined between two adjacent bars and two adjacent crossbars. The holes are elongated along a direction parallel to the bars and they have a substantially rectangular shape with rounded corners 121.

In the example of FIG. 1, the grating reflector is suspended from a supporting structure 160 by arms 161. However, other ways of suspending or otherwise mounting the grating reflector 100 may be used.

Various embodiments of the grating reflector disclosed herein have a high stiffness along both directions in the mesh plane ensuring that the resonance frequency of the lowest bending mode of the grating plate is high compared to a structure without the crossbars. Moreover, the bars and crossbars intersect with each other. Accordingly, the crossbars reduce the tendency of the bars to individually oscillate on their own and eliminates the problem of bars sticking together during fabrication due to capillary forces from drying liquids. These features allow for fast yet controlled actuation, as is e.g. desirable in fast MEMS swept lasers where the stiffness of the electromechanical suspension may desirably be made large to have a large resonance frequency of the so-called piston mode where the flat laser mirror is moved up and down (i.e. along the direction normal to the mesh plane) while the suspension bends.

Moreover, various embodiments of the grating resonator disclosed herein reduce undesirable effects of thermal or air excitation of the mechanical modes, e.g. due to Brownian motion of the air, which might otherwise pose problems, if the grating has a low resonance frequency.

Various embodiments disclosed herein provide a grating resonator which retains advantageous properties of prior art high contrast gratings (HCGs), e.g. low mass, high polarization-dependent reflection over a wide bandwidth, while furthermore possessing significantly increased stiffness thereby alleviating some of the drawbacks of prior art reflectors.

The rounded corners 121 have a radius of curvature. The two dimensional grid is defined by a cross-shaped unit cell 130. An example of such a unit cell is illustrated in FIG. 2.

Figure 2:
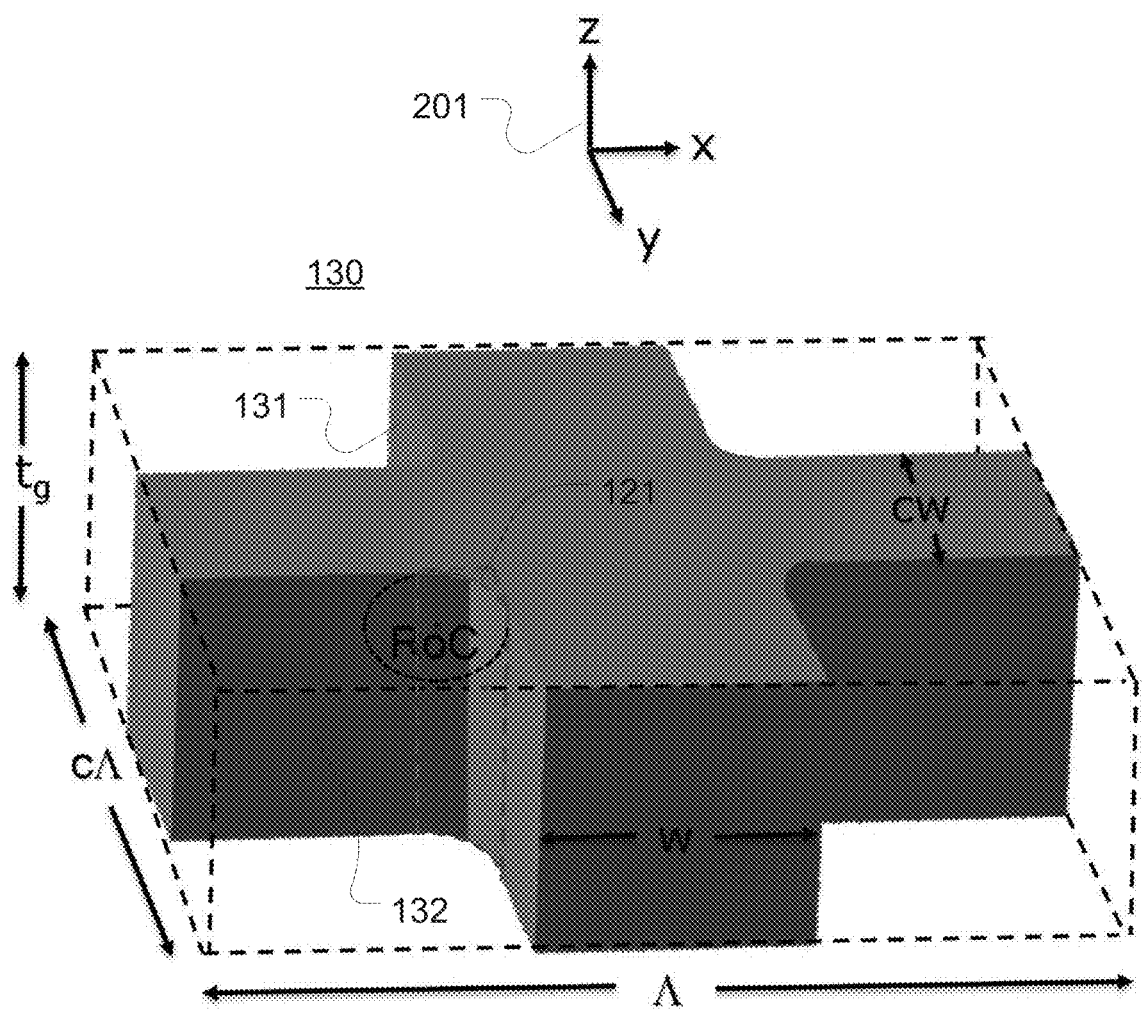
FIG. 2 illustrates a unit cell of the two-dimensional grid defined by the bars and crossbars of the mesh structure of the grating reflector of FIG. 1.

FIG. 2 illustrates a unit cell 130 of the two-dimensional grid defined by the bars and crossbars of the mesh structure of the grating reflector of FIG. 1.

The unit cell 130 comprises a bar section 131 and a crossbar section 132 intersecting the bar section. The unit cell thus has a cross-like shape. Each bar of the mesh structure is thus formed by a sequence of bar sections of respective unit cells and each cross bar of the mesh structure is formed by a sequence of cross bar sections of respective unit cells. Each of the holes of the mesh structure is defined and surrounded by four unit cells. The bar section has a bar width w and a bar section length $c\Lambda$. The bar section length is defined in a longitudinal direction of the bar formed by a sequence of bar sections, i.e. along the y-direction of the coordinate system 201. The bar width is defined in a direction orthogonal to the bar section length, i.e. along the x-direction of the coordinate system 201. The bar section length and the bar width are defined in the mesh plane. The crossbar section 132 has a crossbar width cw and a crossbar section length $\Lambda$. The crossbar section length is defined in a longitudinal direction of the crossbar formed by a sequence of bar sections, i.e. along the x-direction of the coordinate system 201. The crossbar width is defined in a direction orthogonal to the crossbar section length, i.e. along the y-direction of the coordinate system 201. The crossbar section length and the crossbar width are defined in the mesh plane. In FIG. 2 the mesh plane lies in the x-y plane of coordinate system 201, the bars are oriented along the y axis and the cross bars are oriented along the x axis. The thickness of the mesh structure extends along the z axis.

The bar section length corresponds to the period defined by the plurality of parallel crossbars while the crossbar section length corresponds to the period defined by the plurality of parallel bars.

The rounded corners 121 at the intersection between the bars and crossbars have a radius of curvature RoC. The unit cell has a unit cell volume $V_c$ defined by the thickness of the mesh structure, the bar section length, the bar width, the crossbar section length, the crossbar width and by the radius of curvature. Each unit cell thus defines four rounded corners. The radii of curvature of the four corners may be equal or different from each other.

The grating reflector has a reflectivity in a bandwidth around a center wavelength $\lambda_c$. The reflectivity is higher than 0.99. A ratio between the unit cell volume $V_c$ and the center wavelength in the mesh material cubed is between 1.35 and 1.55. In particular, the inventors have found that mesh structures with these unit cell volumes provide a high reflectivity over a broad bandwidth and they can accurately be manufactured using known manufacturing techniques. Moreover they have a high stiffness while being relatively low-mass.

Unless specifically indicated otherwise, the term center wavelength $\lambda_c$ refers to the wavelength in vacuum. The mesh material has a mesh refractive index $n_c$, in particular $n_c > 1$. Accordingly, when radiation having the center wavelength $\lambda_c$ in vacuum propagates through the mesh material, the wavelength of the radiation in the mesh material is $\lambda_{c,m} = \lambda_c / n_c$. The refractive index may depend on the wavelength. Accordingly, for the purpose of the present disclosure, the center wavelength in vacuum $\lambda_c$ will simply be referred to as center wavelength, while the center wavelength of the radiation when propagating through the mesh material, i.e. $\lambda_{c,m}$, will be referred to as center wavelength in the mesh material.

In particular the ratio between the unit cell volume $V_c$ and the center wavelength in the mesh material cubed refers to the ratio $V_c n_c^3 / \lambda_c^3$, i.e.:

$$1.35 < \frac{V_c n_c^3}{\lambda_c^3} = \frac{V_c}{\lambda_{c,m}^3} < 1.55,$$

Where $n_c$ denotes the refractive index of the mesh material at $\lambda_c$ and $\lambda_{c,m} = \lambda_c / n_c$ denotes the center wavelength in the mesh material.

The inventors have realized that a 2D grating with rectangular holes and rounded corners provides for a light and robust reflector that has a high polarization-dependent reflectivity in a broad wavelength band around a center wavelength when the volume of the unit cell of the 2D grid is chosen to be about 35% to 55% percent larger than the center wavelength in the mesh material cubed. In particular, embodiments of the grating reflector can be manufactured with presently available manufacturing technologies while ensuring optimized and predictable optical properties.

The inventors have further realized that a high-reflectivity over a broad wavelength range can be achieved, if the geometry of the unit cell is adapted to the radius of curvature of the rounded corners, i.e. by taking the rounded corners into account when optimizing the remaining dimensions of the unit cell.

In particularly advantageous embodiments, the ratio between the unit cell volume and the center wavelength in the mesh material cubed is selected in a wavelength-dependent interval, in particular such that the ratio fulfills the following conditions:

$$321913\, m^{-1} * \lambda_{c,m} + 1.27 < \frac{V_c}{\lambda_{c,m}^3} < 655279\, m^{-1} * \lambda_{c,m} + 1.24.$$

In some embodiments, the bandwidth is at least 10% of the center wavelength, i.e. the grating reflector has a reflectivity higher than 0.99 within a wavelength range around the center wavelength where the wavelength range has a bandwidth of at least 10% of the center wavelength. In some embodiments, the grating reflector has a reflectivity higher than 0.994 within said wavelength range.

In various embodiments, the reflectivity is polarization-dependent. Accordingly, the grating reflector has a reflectivity higher than 0.99, in particular higher than 0.994, at least for radiation having one polarization direction, within a wavelength range around the center wavelength where the wavelength range has a bandwidth of at least 10% of the center wavelength.

In some embodiments, the parameters defining the volume of the unit cell are chosen such that the reflectivity in the bandwidth around the center wavelength is higher than a threshold reflectivity. The threshold reflectivity may be 0.99, preferably 0.994.

The parameters defining the volume of the unit cell are, or at least include, the following parameters: the thickness of the mesh structure, the bar section length, the bar width, the crossbar section length, the crossbar width and the radius of curvature. As will be described in greater detail below, some or all of the above parameters may be determined by performing an optimization process for optimizing the reflectivity within a wavelength range around a center wavelength. In some embodiments, the optimization may be performed subject to one or more constraints, e.g. subject to one or more of the parameters defining the volume of the unit cell being fixed to predetermined values or only allowed to vary in predetermined intervals. As the parameters defining the volume of the unit cell include the radius of curvature of the rounded corners, an optimized unit cell geometry that results in a high reflectivity over a broad bandwidth can be obtained for a variety of manufacturing methods. To this end, the selection of the radius of curvature may be a selection within certain constraints, in particular restricted to a predetermined radius of curvature or to a selection from a predetermined range of radii of curvature that is/are obtainable by the manufacturing technique to be employed.

In some embodiments, the center wavelength in the mesh material is between 200 nm and 500 nm, such as between 250 nm and 450 nm. In some embodiments, the center wavelength in vacuum is between 900 nm and 1600 nm, such as between 950 nm and 1550 nm.

The 2D grating may be a 2D high contrast grating (HCG), where the mesh structure has a large contrast in refraction index with the surrounding material. Various embodiments of the grating reflector thus provide an efficient reflector having a particularly short penetration depth and low weight. When used as a reflector in a VCSEL, a particularly short cavity length may thus be achieved. Therefore, a higher resonance frequency and wider wavelength sweeping range may be obtained.

In preferred embodiments the mesh material is a high refractive index material, in particular a material having refractive index of at least 2.5, such as at least 3, i.e. $n_c \geq 2.5$, such as $n_c \geq 3$. Examples of suitable materials include GaAs, Silicon, Germanium, In0.49Ga0.51P, InP, AlxGa(1-x)As, AlxGa(1-x)Sb. In one embodiment, the mesh material is GaAs.

Figure 3:
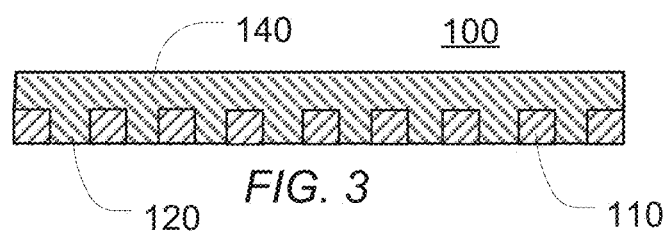
FIG. 3 schematically illustrates an example of a grating reflector having a first layer in addition to the mesh structure, in accordance with an embodiment described herein.

FIG. 3 schematically illustrates an example of a grating reflector 100 having a first layer 140 in addition to the mesh structure 110. The grating reflector 100 of this embodiment comprises a mesh structure 110 as described in connection with FIGS. 1 and 2. Additionally, the grating comprises a first layer 140 of a first low refractive index material. The first low refractive index material has a first refractive index $n_1$ lower than the mesh refractive index $n_c$, of the mesh material of the mesh structure 110, i.e. $n_c > n_1$. The first layer 140 extends on a first side of the mesh structure 140. The first layer 140 may be a solid material or it may be a gas, in particular air. The first layer of the first low refractive index material may extend into the holes 120, in particular such that it fills the holes in their entirety.

Figure 4:
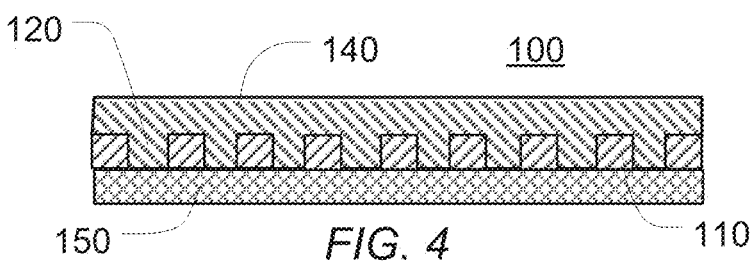
FIG. 4 schematically illustrates an example of a grating reflector having a first layer and a second layer in addition to the mesh structure, in accordance with an embodiment described herein.

FIG. 4 schematically illustrates another example of a grating reflector 100 having a first layer 140 and a second layer 150. The grating reflector 100 of this embodiment comprises a mesh structure 110 and a first layer 140 on a first side of the mesh structure as described in connection with FIG. 3. Additionally, the grating reflector 100 comprises a second layer 150 of a second low refractive index material having a second refractive index $n_2$. The second refractive index is lower than the mesh refractive index $n_c$, i.e. $n_2 < n_c$. The second layer 150 extends on a second side of the mesh structure, opposite the first side. As in the example of FIG. 3, the first layer of the first low refractive index material may extend into the holes 120, in particular such that it fills the holes in their entirety. The first and second refractive index may be equal or they may be different from each other. In particular, the first and second low refractive materials may be the same or different materials. One or each of the first and second low refractive index materials may be a solid or a gas, e.g. air.

FIG. 5 schematically illustrates an example process for manufacturing a grating reflector, in particular a grating reflector as described with reference to any one of FIGS. 1-4.

Generally, the method comprises the following steps:

In step S1, the process selects the thickness of the mesh structure, the bar section length, the bar width, the crossbar section length, the crossbar width and the radius of curvature such that a reflectivity of the reflector in a bandwidth around a predetermined center wavelength is higher than a predetermined threshold reflectivity; examples of a suitable selection process will be described in more detail below with reference to FIGS. 6A and 6B.

In step S2, the grating reflector having the selected thickness of the mesh structure, the selected bar section length, the selected bar width, the selected crossbar section length, the selected crossbar width and the selected radius of curvature is manufactured. The manufacturing may be performed using a suitable manufacturing technique known as such in the art, i.e. e-beam lithography, deep ultraviolet (DUV) lithography, nano-imprint lithography (NIL).

In some embodiments selecting the thickness of the mesh structure, the bar section length, the bar width, the crossbar section length, the crossbar width and the radius of curvature includes performing an optimization process.

The optimization process may include computation of the reflectivity of a grating reflector as a function of the unit cell geometry. The computation may include a rigorous couple-wave analysis (RCWA) of the behavior of the grating reflector. Rigorous couple-wave analysis (RCWA) is a method known as such in the art, see e.g. the following lecture notes on Rigorous Coupled-Wave Analysis (RCWA) available online at empossible.net: (i) "Advanced Computation: Computational Electromagnetics—Formulation of Rigorous coupled-Wave Analysis (RCWA)" dated Apr. 6, 2020; (ii) "Advanced Computation: Computational Electromagnetics—Implementation of Rigorous Coupled-Wave Analysis (RCWA)" dated Oct. 28, 2019; and (iii) "RCWA Extras" dated Jun. 2, 2021.

The inventors have realized that, in order to accurately compute the optical properties of the grating reflector, including its reflectivity, the computation should preferably account for the rounded corners of the holes. Otherwise, if the computation is based on an idealized design with sharp edges (corresponding to a radius of curvature equal to zero), the computation would not reflect the optical properties of the manufactured reflector, as the manufacturing cannot reproduce an infinitely small radius of curvature. Accordingly, in embodiments of the method, the optical properties of a grating reflector with rounded corners having a finite radius of curvature are computed, and the remaining parameters determining the volume of the unit cell are optimized for a predetermined radius of curvature or under the constraint that the radius of curvature is larger than a predetermined minimum radius. The minimum radius may be chosen in accordance with the chosen manufacturing process, as different processes are capable of achieving more or less sharp corners. In some embodiments, the predetermined radius of curvature or the predetermined minimum radius is between 5 nm and 100 nm, such as between 10 nm and 80 nm, such as between 15 nm and 70 nm.

FIG. 6A schematically illustrates an example process for selecting the thickness of the mesh structure, the bar section length, the bar width, the crossbar section length, the crossbar width and the radius of curvature such that a reflectivity of the reflector in a bandwidth around a predetermined center wavelength is higher than a predetermined threshold reflectivity.

In an initial step S11, the process selects one or more of the following constraints:
- the mesh material or the refractive index of the mesh material
- a predetermined radius of curvature or a minimum radius of curvature
- a center wavelength or a range of center wavelengths
- one or more ranges for one or more dimensions defining the unit cell of the grid structure, i.e. one or more of the thickness of the mesh structure, the bar section length, the bar width, the crossbar section length, the crossbar width.

For example, the constraints may be defined responsive to a user input. When selecting a constraint includes selecting a single value, the subsequent optimization will be performed with that parameter held fixed at the selected value. When selecting a constraint includes selecting a range of a value, the subsequent optimization will be performed with that parameter being allowed to vary within the selected range.

In particular, in some embodiments, the radius of curvature is predetermined, e.g. corresponding to the manufacturing process to be employed and/or depending on the choice of mesh material. During the subsequent optimization, the radius of curvature may thus be held fixed and not treated as a variable. Accordingly, in such embodiments only one or more, such as all, of the remaining parameters defining the dimensions of the unit cell are varied during the optimization process. In other embodiments, the radius of curvature may be allowed to vary during the optimization, but only within predetermined constraints, in particular only at values larger than a predetermined minimum radius of curvature. Similarly, in some embodiments, the center wavelength is predetermined and kept fixed during the optimization while, in other embodiments, the center wavelength may be allowed to vary, e.g. within a predetermined range.

In subsequent step S12, initial values for the parameters that are allowed to vary are selected, e.g. automatically or responsive to user input. Moreover, one or more parameters of the optimization process may be initialized.

In subsequent step S13, one or more optical properties of the grating reflector, in particular the reflectivity as a function of wavelength, are computed using the initial values as current values. The computation may include a rigorous couple-wave analysis (RCWA) of the behavior of the grating reflector.

In subsequent step S14, the current values of the variable parameters determining the volume of the unit cell are modified, optionally within predetermined constraints. The modification may be based on a suitable incremental optimization method known as such in the art. In some embodiments a predetermined heuristic strategy for selecting and modifying the parameters may be used, e.g. as illustrated in the example of FIG. 6B.

As explained above, in some embodiments, the radius of curvature and/or the center wavelength is/are predetermined and held fixed. In other embodiments, the radius of curvature may be allowed to vary during the optimization, but only within predetermined constraints, in particular only at values larger than a predetermined minimum radius of curvature.

The process then returns to step S13 and computes the one or more optical properties based on the modified current values. The process is repeated until a suitable termination criterion is reached.

FIG. 6B schematically illustrates an example process for selecting the thickness of the mesh structure, the bar section length, the bar width, the crossbar section length, the crossbar width and the radius of curvature such that a reflectivity of the reflector in a bandwidth around a predetermined center wavelength is higher than a predetermined threshold reflectivity.

In the example of FIG. 6B, the thickness of the mesh structure and the radius of curvature are selected in accordance with a selected manufacturing technique. For example, during wafer production, the manufacturing process may be limited to a fixed thickness of the mesh structure and to a fixed, finite radius of curvature.

Accordingly, in an initial step S21, the process selects the thickness of the mesh structure and the radius if curvature as predetermined constraints. It will be appreciated that other embodiments may select additional and/or alternative constraints. The process further selects a target center wavelength.

In subsequent step S22, the process selects an initial value of the mesh periods in x- and y-direction. The periods correspond to the bar section length and crossbar section length, respectively.

In step S23, the process computes the reflectivity of the mesh structure at the center wavelength for respective values of the widths of the bars and crossbars, e.g. by incrementally varying each of the widths to obtain a matrix of reflectivity values.

In step S24, the process selects a pair of bar and crossbar widths that result in a high reflectivity, e.g. by selecting a pair having a maximum reflectivity among the computed pairs.

In step S25, the process determines, for the selected widths of the bars and cross bars, the reflectivity for a range of wavelengths around the center wavelength and determines whether the reflectivity is sufficiently high over a sufficiently broad range, e.g. using a predetermined success criteria. An example success criterion is a reflectivity of at least 99.4% over a wavelength range of at least 10% of the center wavelength.

If the reflectivity fulfills the success criterion, the process terminates and outputs the thus determined dimensions of the mesh structure and the corresponding reflectivity. Otherwise, if all pairs of bar and crossbar widths of the matrix have been analyzed, the process proceeds at step 22 to select another pair of periods in the x- and y-direction. Otherwise, the process proceeds at step S24 to select another pair of bar and crossbar widths, e.g. the pair having the next highest reflectivity at the center wavelength.

It will be appreciated, that alternative embodiments of the process may use different selection strategies for the parameters. For example, in one embodiment, the process may select a set of periods and a crossbar width. The process may then, for different values of the bar width, compute the reflectivity for a range of wavelengths around the center wavelength. If one of the bar widths results in a sufficiently high-reflectivity mesh over a sufficiently broad wavelength range around the center wavelength, the process terminates. Otherwise, the process varies one or more of the remaining geometry parameters.

Figure 7A:
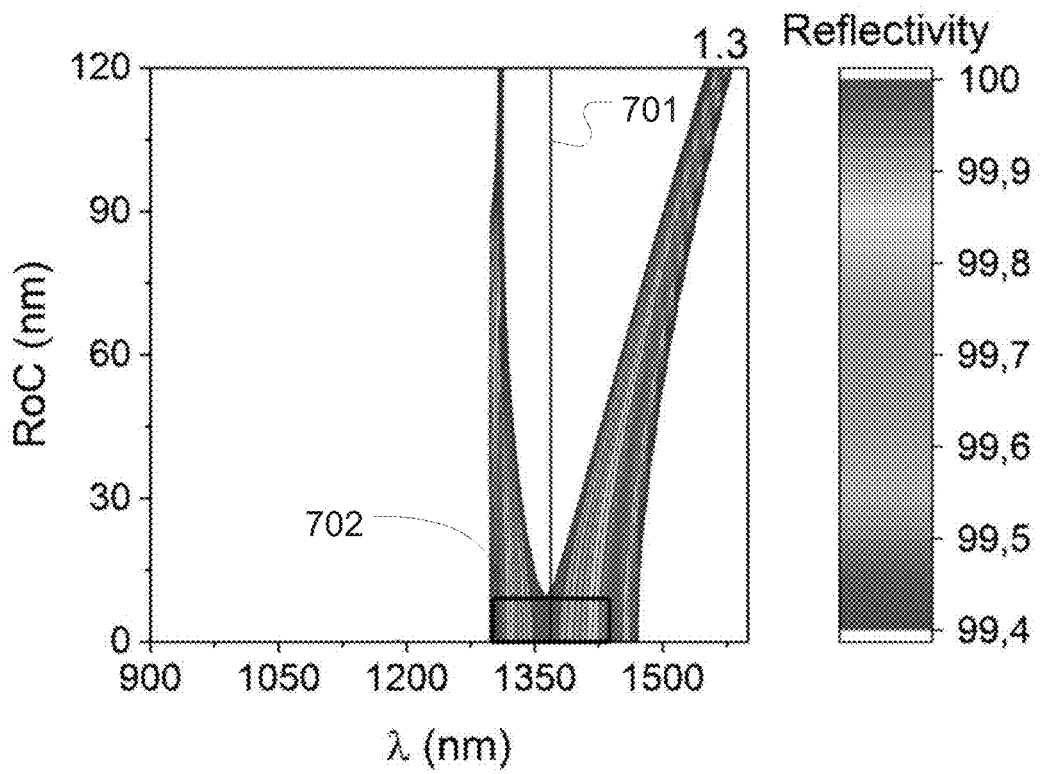
FIGS. 7A and 7B illustrate results of the process of FIGS. 5 and FIG. 6A or 6B.
Figure 7B:
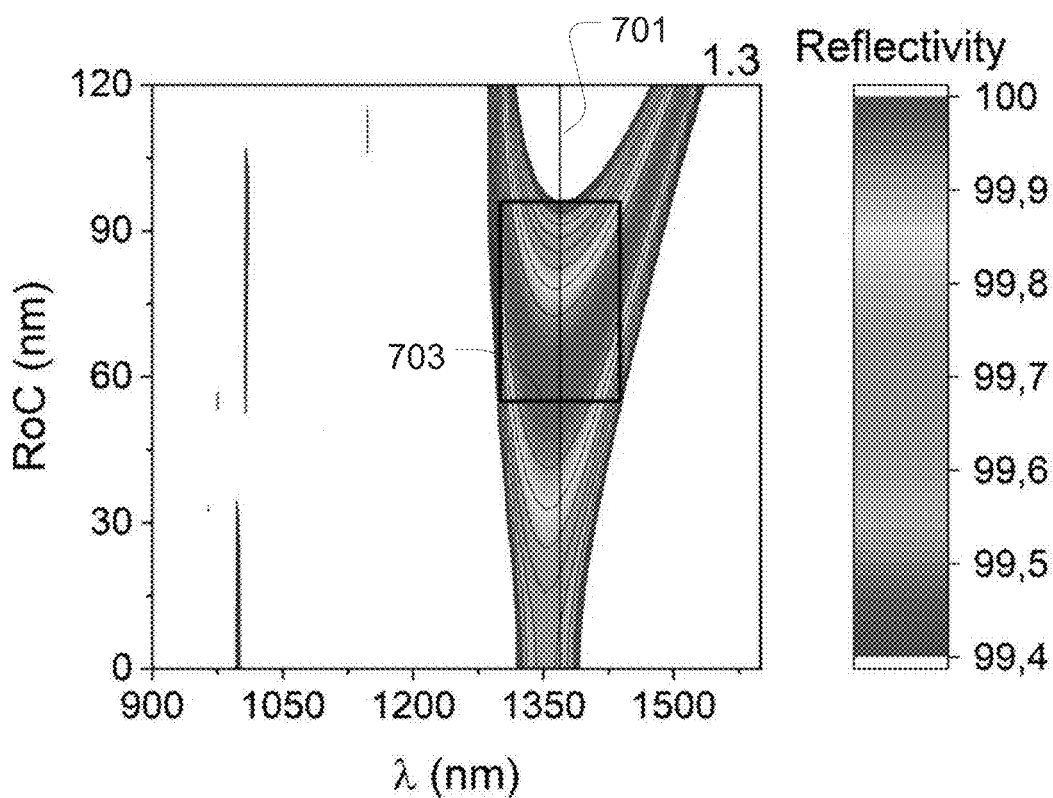

FIGS. 7A and 7B illustrate results of the optimization process. In particular, FIGS. 7A and 7B illustrate, for different predetermined values of the radius of curvature (RoC) of the rounded corners the bandwidth around a predetermined center wavelength 701, where the reflectivity is higher than 99.4%. To this end, for a predetermined RoC, the remaining parameters determining the volume of the unit cell of the grid structure have been adjusted so as to optimize the reflectivity. FIGS. 7A and 7B illustrate how the obtained reflectivity for the optimized unit cell varies for different values of the radius of curvature around the predetermined value. In the example of FIG. 7A, the predetermined value of the radius of curvature was RoC=0 nm and in the example of FIG. 7B, the predetermined radius of curvature was RoC=54 nm.

As can be seen from FIG. 7A, in this example, a reflectivity of at least 99.4 can be obtained in a bandwidth around the center wavelength that has a width of 10% of the center wavelength, if the radius of curvature is between 0 nm and about 15 nm, as illustrated by the rectangle 702. The volume of the unit cell for the optimized solution and with the radius of curvature varying between 0 nm and 15 nm is smaller than about $1.48\lambda_{c,m}^3$, where $\lambda_{c,m}$ denotes the center wavelength in the mesh material, thus defining a maximum preferred volume of the unit cell for this center wavelength.

Similarly, in the example of FIG. 7B, a reflectivity of at least 99.4 can be obtained in a bandwidth around the center wavelength that has a width of 10% of the center wavelength, if the radius of curvature is between about 53 nm and about 100 nm, as illustrated by the rectangle 703. The volume of the unit cell for the optimized solution and for solutions with the radius of curvature varying between about 53 nm and about 100 nm is larger than about $1.38\lambda_{c,m}^3$, thus defining a minimum preferred volume of the unit cell for this center wavelength.

Generally, it will be appreciated that a radius of curvature of 0 nm merely corresponds to a theoretical limit, as known manufacturing techniques will typically result in a finite radius of curvature RoC>0. Accordingly, in various embodiments, the RoC is selected to be larger than a minimum radius $RoC_{min}$ that is achievable with the manufacturing technique employed i.e. $RoC \geq RoC_{min} > 0$. The obtainable minimum radius of curvature may also depend on the mesh material. For example, the radius of curvature may be no smaller than 2 nm, such as no smaller than 5 nm, such as no smaller than 10 nm, such as no smaller than 15 nm, such as no smaller than 25 nm, such as no smaller than 35 nm, such as no smaller than 45 nm.

Figure 8:
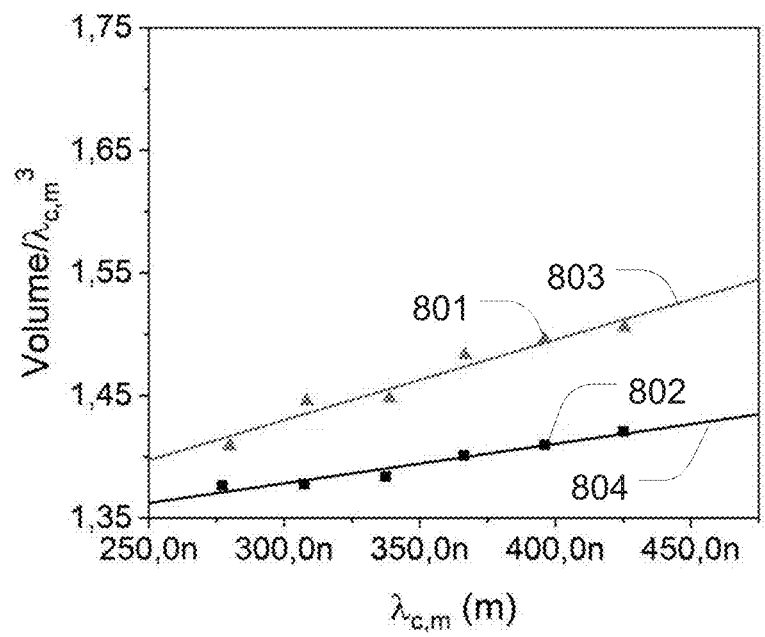
FIG. 8 shows results of the process of FIG. 5 and FIG. 6A or 6B for different center wavelengths.

FIG. 8 shows the results of the optimization process for different center wavelengths in the mesh material. In particular, for each center wavelength in the mesh material, FIG. 8 shows the upper and lower bounds of the volume of the unit cell for which optimized values of the parameters defining the dimensions of the unit cell can be found, such that the reflectivity in a bandwidth around the center wavelength, which has a width of 10% of the center wavelength, is at least 99.4%. For example, points 801 and 802 indicate the upper and lower bound of the volume for the center wavelength corresponding to the examples of FIGS. 7A and 7B, respectively.

As can be seen from FIG. 8, there is a linear relation between the upper/lower bounds and the center wavelength in the mesh material, as illustrated by lines 803 and 804 respectively.

Accordingly, when the volume of the unit cell relative to the center wavelength in the mesh material cubed lies between these lines, an optimized solution can be found, i.e. the volume of the unit cell should preferably fulfill the following conditions:

$$321913m^{-1} * \lambda_{c,m} + 1.27 < \frac{V_c}{\lambda_{c,m}^3} < 655279m^{-1} * \lambda_{c,m} + 1.24.$$

In any event, the inventors have found that the volume of the unit cell relative to the center wavelength in the mesh material cubed should lie between 1.35 and 1.55, at least for center wavelengths in the range between 900 nm and 1600 nm.

Figure 9:
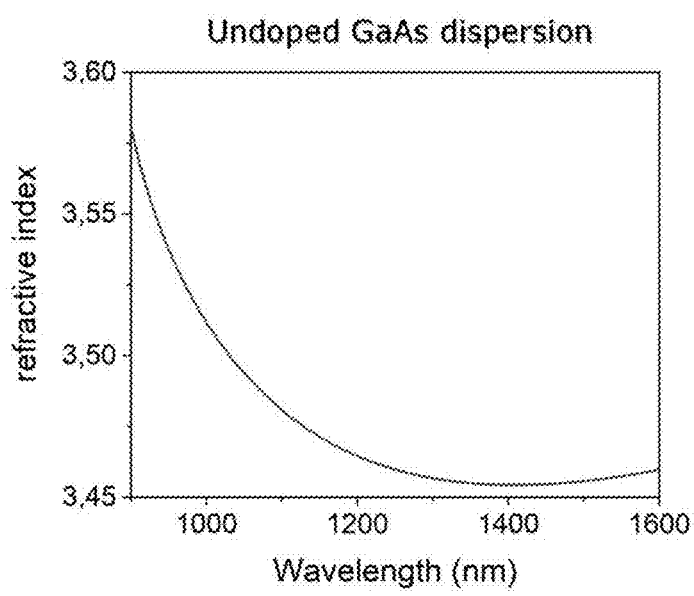
FIG. 9 illustrates the refractive index of undoped GaAs as a function of center wavelength.

The examples of FIGS. 7 and 8 have been computed for a mesh structure where the mesh material is GaAs. FIG. 9 illustrates the refractive index $n_c$ of undoped GaAs as a function of center wavelength.

Figure 10:
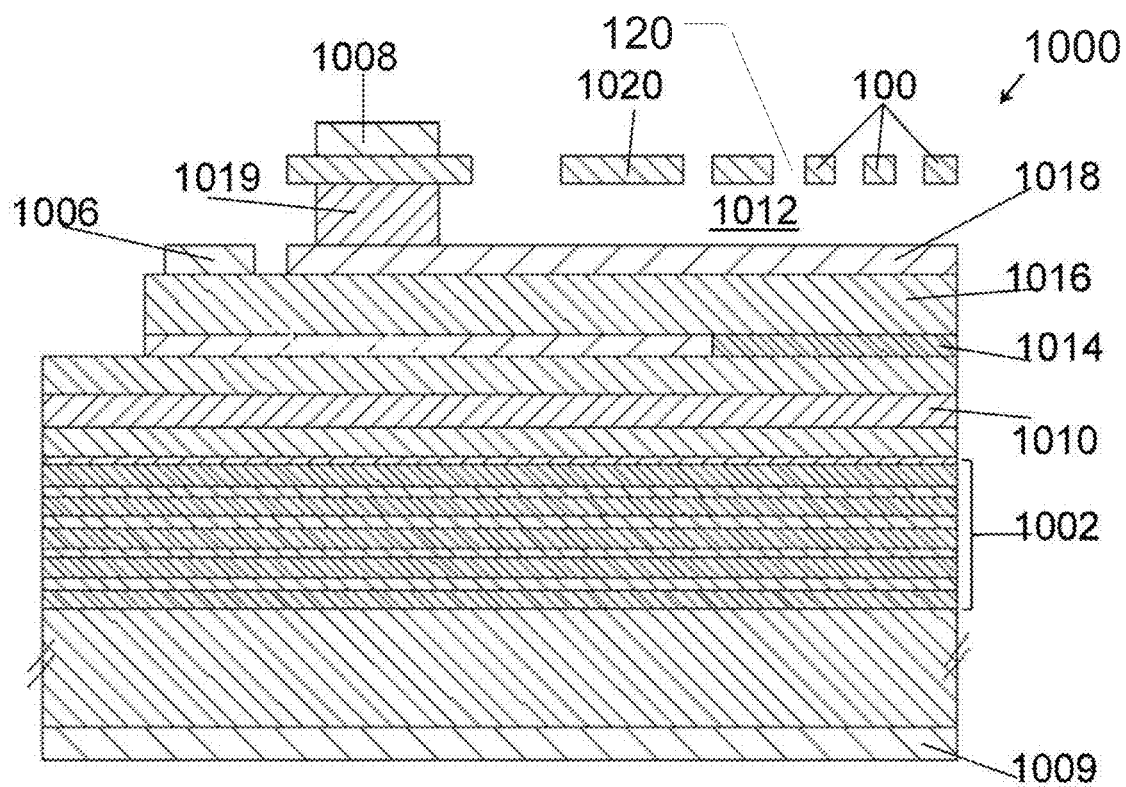
FIG. 10 schematically illustrates an example of a tunable vertical cavity surface emitting laser in accordance with embodiments described herein.

FIG. 10 schematically illustrates an example of a tunable vertical cavity surface emitting laser, generally designated by reference numeral 1000.

Generally, in various embodiments, the tunable vertical cavity surface emitting laser comprises a movable grating reflector 100 comprising a mesh structure of a mesh material. The mesh structure defines a mesh plane and having a thickness normal to the mesh plane and comprises a plurality of parallel bars and a plurality of parallel crossbars. The crossbars extend along a direction orthogonal to the bars, and the bars and crossbars define a two-dimensional grid of elongated holes 120. Each hole extends through the mesh structure in a direction normal to the mesh plane, and each hole is defined between two adjacent bars and two adjacent crossbars. The holes are elongated along a direction parallel to the bars, and they have a substantially rectangular shape with rounded corners having a radius of curvature. The two dimensional grid is defined by a cross-shaped unit cell of the grid, the unit cell comprises a bar section and a crossbar section intersecting the bar section, the bar section having a bar width and a bar section length, the crossbar section having a crossbar width and a crossbar section length. The unit cell has a unit cell volume defined by the thickness of the mesh structure, the bar section length, the bar width, the crossbar section length, the crossbar width and by the radius of curvature.

The grating reflector has a reflectivity in a bandwidth around a center wavelength higher than 0.99. A ratio between the unit cell volume and the center wavelength in the mesh material cubed is between 1.35 and 1.55.

In particular, FIG. 10 illustrates a schematic cross-sectional view of a VCSEL laser source 1000 according to one embodiment. The embodiment shown comprises a bottom (first) reflector in the form of a distributed Bragg reflector (DBR) 1002 and a top (second) grating reflector 100, e.g. a reflector as described in connection with FIGS. 1-4. The grating reflector 100 is surrounded by air. The second reflector is resiliently mounted to the structure by a suspension 1020 comprising a microelectromechanical system (MEMS). By applying a voltage between a first MEMS contact 1006, doubling as an intra-cavity laser anode, and a second MEMS contact 1008 in proximity to the second reflector, an electrostatic force acting to attract the second reflector 100 towards the first reflector 102 may be introduced. The second reflector and the suspension together form a MEMS oscillator having a mechanical resonance frequency. By adapting the MEMS oscillator to have a suitably high mechanical quality factor (Q), the second reflector may initiate a substantially symmetrical oscillation around a rest position of the MEMS. To this end, in some embodiments, a modulating voltage is applied across the MEMS contacts with a modulating frequency equal to the resonance frequency or a harmonic thereof. Thus, the movement of the second reflector may act to both shorten and lengthen the cavity during oscillation, which in turn changes the cavity to support both shorter and longer wavelengths, respectively.

The laser anode 1006 together with a laser cathode 1009 together enables carrier injection into an active region 1010, which is here in the form of a multiple quantum well (MQW) structure. In other words, in this embodiment, the laser is electrically pumped. In other embodiments, however, the laser source may be optically pumped.

In the particular embodiment shown in FIG. 10, the laser source 1000 is of the extended cavity design type, as this configuration has the good trade-off between threshold material gain and tuning efficiency. For example, the bottom n-doped DBR reflector 1002 may have 35 mirror pairs of Al0.9Ga0.1As/GaAs. The DBR reflectance may be made larger than the top reflectance of the second reflector to achieve a top-emitting structure. The active region 1010 may comprise In0.3Ga0.7As MQWs placed at the anti-node of an electric field at a wavelength of e.g. 1060 nm. The In0.3Ga0.7As layers may be highly strained and in order to compensate GaAs0.8P0.2 may be used as barrier layers. Current confinement may be achieved through introduction of an oxide aperture 1014, e.g. by oxidizing a 55 nm Al0.98Ga0.02As layer. An oxide aperture of 8 µm was found to ensure single-mode operation. A moderately p-doped GaAs current spreading layer 1016 may make up the anode of the pin-junction diode. In order to reduce the parasitic reflectance at the high-index contrast semiconductor to air interface, an Al2O3 anti-reflective coating (ARC) 1018 may be employed. The final air-gap 1012 height may be defined by a sacrificial layer 119, which may be removed during processing. The second reflector may include an n-doped GaAs mesh structure as described herein, e.g. with a thickness of about 280 nm. It will be appreciated that various modifications may be made to the VCSEL.

It will be appreciated that various embodiments of the grating reflector disclosed herein may also be used in other applications/devices, e.g. in a photodetector or spectrometer or in applications where a broadband light source is desirable.

Various aspects have been described with reference to various embodiments. Modifications and alterations will occur to others upon reading the present disclosure. It is intended that the invention be construed as including all such modifications and alterations, including insofar as they come within the scope of the appended claims and the equivalents thereof.

The invention claimed is:

1. A grating reflector, comprising:
a mesh structure of a mesh material, the mesh structure defining a mesh plane and having a thickness normal to the mesh plane, the mesh structure comprising a plurality of parallel bars and a plurality of parallel crossbars, the crossbars extending along a direction orthogonal to the bars, the bars and crossbars defining a two-dimensional grid of elongated holes, each hole extending through the mesh structure in a direction normal to the mesh plane, each hole being defined between two adjacent bars and two adjacent crossbars, the holes being elongated along a direction parallel to the bars, the holes having a substantially rectangular shape with rounded corners, the two dimensional grid being defined by a plurality of cross-shaped unit cells, each of the cross-shaped unit cells comprising a bar section and a crossbar section intersecting the bar section to form the cross shape that includes four interior corners, each of the four interior corners being rounded and having a radius of curvature, the bar section having a bar width and a bar section length, the crossbar section having a crossbar width and a crossbar section length;
wherein each of the cross-shaped unit cells having a unit cell volume defined by the thickness of the mesh structure, the bar section length, the bar width, the crossbar section length, the crossbar width and by the radii of curvature of the four interior rounded corners;
wherein the grating reflector has a reflectivity in a bandwidth around a center wavelength higher than 0.99, and wherein a ratio between the unit cell volume and the center wavelength in the mesh material cubed is between 1.35 and 1.55.

2. The grating reflector according to claim 1, wherein the mesh material has a mesh refractive index and wherein the grating reflector comprises a first layer of a first low refractive index material having a first refractive index lower than the mesh refractive index, the first layer extending on a first side of the mesh structure.

3. The grating reflector according to claim 2, wherein the first low refractive index material is air.

4. The grating reflector according to claim 2, wherein the first layer of the first low refractive index material extends into the holes.

5. The grating reflector according to claim 2, comprising a second layer of a second low refractive index material having a second refractive index lower than the mesh refractive index, the second layer extending on a second side of the mesh structure, opposite the first side.

6. The grating reflector according to claim 5, wherein the first low refractive index material is air.

7. The grating reflector according to claim 6, wherein the first low refractive index material is the same material as the second low refractive index material.

8. The grating reflector according to claim 1, wherein the mesh material has a refractive index of at least 3.

9. The grating reflector according to claim 1, wherein the mesh material is chosen from GaAs, Silicon, Germanium, In0.49Ga0.51P, InP, AlxGa(1−x) As, AlxGa(1−x)Sb.

10. The grating reflector according to claim 9, wherein the mesh material is GaAs.

11. The grating reflector according to claim 1, wherein the ratio between the unit cell volume and the center wavelength in the mesh material cubed is between 321913 m$^{-1}$*$\lambda_{c,m}$+1.27 and 655279 m$^{-1}$*$\lambda_{c,m}$+1.24, where $\lambda_{c,m}$ denotes the center wavelength in the mesh material.

12. The grating reflector according to claim 1, wherein the bandwidth is at least 10% of the center wavelength.

13. The grating reflector according to claim 1, wherein the thickness of the mesh structure, the bar section length, the bar width, the crossbar section length, the crossbar width and the radius of curvature are chosen such that the reflectivity in the bandwidth around the center wavelength is higher than a threshold reflectivity.

14. The grating reflector according to claim 13, wherein the threshold reflectivity is at least 0.994.

15. The grating reflector according to claim 1, wherein the center wavelength in the mesh material is between 200 nm and 500 nm, such as between 250 nm and 450 nm.

16. The grating reflector according to claim 1, wherein the reflectivity is polarization-dependent.

17. A wavelength tunable or wavelength sweepable vertical cavity surface emitting laser, comprising:
a movable grating reflector comprising a mesh structure of a mesh material, the mesh structure defining a mesh plane and having a thickness normal to the mesh plane and comprising a plurality of parallel bars and a plurality of parallel crossbars, the crossbars extending along a direction orthogonal to the bars, the bars and crossbars defining a two-dimensional grid of elongated holes, each hole extending through the mesh structure in a direction normal to the mesh plane, each hole being defined between two adjacent bars and two adjacent crossbars, the holes being elongated along a direction parallel to the bars, the holes having a substantially rectangular shape with rounded corners, the two dimensional grid being defined by a plurality of cross-shaped unit cells of the grid, each of the unit cells comprising a bar section and a crossbar section intersecting the bar section to form the cross shape that includes four interior corners, each of the four interior corners being rounded and having a radius of curvature, the bar section having a bar width and a bar section length, the crossbar section having a crossbar width and a crossbar section length;
wherein each of the unit cells having a unit cell volume defined by the thickness of the mesh structure, the bar section length, the bar section width, the crossbar section length, the crossbar width and by the radii of curvature of the four interior corners;
wherein the grating reflector has a reflectivity in a bandwidth around a center wavelength higher than 0.99, and wherein a ratio between the unit cell volume and the center wavelength in the mesh material cubed is between 1.35 and 1.55.

18. A method for manufacturing a grating reflector, the grating reflector comprising a mesh structure of a mesh material, the mesh structure defining a mesh plane and having a thickness normal to the mesh plane and comprising a plurality of parallel bars and a plurality of parallel crossbars, the crossbars extending along a direction orthogonal to the bars, the bars and crossbars defining a two-dimensional grid of elongated holes, each hole extending through the mesh structure in a direction normal to the mesh plane, each hole being defined between two adjacent bars and two adjacent crossbars, the holes being elongated along a direction parallel to the bars, the holes having a substantially rectangular shape with rounded corners, the two dimensional grid being defined by a plurality of cross-shaped unit cells of the grid, each of the unit cells comprising a bar section and a crossbar section intersecting the bar section to form the cross shape that includes four interior corners, each of the four interior corners being rounded and having a radius of curvature, the bar section having a bar width and a bar section length, the crossbar section having a crossbar width and a crossbar section length, each of the unit cells having a unit cell volume defined by the thickness of the mesh structure, the bar section length, the bar width, the crossbar section length, the crossbar width and by the radii of curvature of the four interior corners;

wherein the method comprises:

selecting the thickness of the mesh structure, the bar section length, the bar width, the crossbar section length, the crossbar width and the radii of curvature of the four interior corners such that a reflectivity of the reflector in a bandwidth around a predetermined center wavelength is higher than a predetermined threshold reflectivity; and manufacturing the grating reflector having the selected thickness of the mesh structure, the selected bar section length, the selected bar width, the selected crossbar section length, the selected crossbar width and the selected radii of curvature.

19. The method according to claim 18, wherein manufacturing comprises applying a predetermined manufacturing process and wherein the radii of curvature is predetermined and corresponds to a radius of curvature obtainable by the predetermined manufacturing process.

20. The method according to claim 18, wherein selecting the thickness of the mesh structure, the bar section length, the bar width, the crossbar section length, the crossbar width and the radius of curvature comprises selecting the thickness of the mesh structure, the bar section length, the bar width, the crossbar section length, the crossbar width and the radii of curvature such that a ratio between the unit cell volume and the center wavelength in the mesh material cubed is between 1.35 and 1.55.

* * * * *